United States Patent [19]

Leiber

[11] Patent Number: 4,736,588
[45] Date of Patent: Apr. 12, 1988

[54] HYDRAULIC BRAKE BOOSTER WITH COAXIAL AXIALLY SPACED BOOSTER PISTONS

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 788,287

[22] Filed: Oct. 17, 1985

[30] Foreign Application Priority Data

Dec. 8, 1984 [DE] Fed. Rep. of Germany ....... 3444829

[51] Int. Cl.$^4$ .................... B60T 11/24; B60T 13/12
[52] U.S. Cl. ........................................ 60/550; 60/562; 60/589; 91/519
[58] Field of Search ............. 60/547.1, 550, 562, 60/574, 576, 577; 91/519

[56] References Cited

U.S. PATENT DOCUMENTS

| | | | |
|---|---|---|---|
| 3,191,384 | 6/1965 | Krusemark | 60/577 |
| 4,191,020 | 3/1980 | Krohn et al. | 60/577 X |
| 4,244,185 | 1/1981 | Belart | 60/576 X |
| 4,263,784 | 4/1981 | Steffes | 60/547.1 |
| 4,283,994 | 8/1981 | Belart | 60/547.1 X |
| 4,285,198 | 8/1981 | Budecker | 60/562 X |
| 4,341,076 | 7/1982 | Steffes | 60/547.1 |
| 4,434,619 | 3/1984 | Kobayashi | 60/547.1 |
| 4,435,960 | 3/1984 | Farr | 60/547.1 |
| 4,492,082 | 1/1985 | Belart | 60/589 |
| 4,530,209 | 7/1985 | Steffes | 60/547.1 |
| 4,550,567 | 11/1985 | Schaefer | 60/589 X |

FOREIGN PATENT DOCUMENTS 2138085A 8/1982 United Kingdom .
2129517A 11/1982 United Kingdom .

Primary Examiner—Robert E. Garrett
Assistant Examiner—George Kapsalas
Attorney, Agent, or Firm—Edwin E. Greigg

[57] ABSTRACT

A brake booster has a first booster cylinder and a booster piston disposed in it for displacing a rod-like master cylinder piston of a master cylinder which supplies at least one brake circuit (I, II), having a tappet for mechanically displacing the first booster piston as needed if the brake boosting is inadequate, and having a brake valve coupled to the tappet and the first booster piston for direction boosting pressure into the first booster cylinder. A second, annular booster piston surrounds the rod-like master cylinder piston and likewise has a booster cylinder. Thsi second booster piston is joined to a pump piston which is likewise annular and sealingly surrounds the rod-like master cylinder piston. When the pressure supply apparatus is in operation, actuation of the brake pedal simultaneously displaces both booster pistons and generates braking pressures in the brake circuits (I, II). If the pressure supply apparatus fails, then only the rod-like master cylinder piston is displaced by the brake pedal so that the brake pedal travel becomes considerably longer.

9 Claims, 2 Drawing Sheets

HYDRAULIC BRAKE BOOSTER WITH COAXIAL AXIALLY SPACED BOOSTER PISTONS

BACKGROUND OF THE INVENTION

The invention is based on a brake booster as generally defined hereinafter. Brake boosters are already known (German Offenlegungsschrift No. 32 40 404), in which the brake valves connected to pressure supply apparatuses are built into displaceable booster pistons, so that coaxially aligned tappets provided for actuating the brake valves travel substantially equally long displacement distances as do the booster pistons. It is also possible to dispose a brake valve next to the associated booster piston (German Offenlegungsschrift No. 32 32 051), and to actuate it via a lever mechanism that is coupled with the booster piston and the coaxially aligned tappet. In this brake booster as well, the displacement paths of the booster piston are substantially equal in length to those of the tappet. The diameters of the master cylinder pistons, which are displaced by means of such brake boosters, are selected such that if the pressure supply apparatuses fail then the force of the operator's foot, which is exerted via the brake pedals, tappets and the booster pistons upon the master cylinder piston are adequate to generate sufficiently high emergency braking forces. This has the disadvantage, however, especially when used with disk brakes, of requiring very long pedal travel paths as well as greater length of foot movement or pedal forces.

SUMMARY OF THE INVENTION

The brake booster according to the invention has the advantage over the prior art that during braking with hydraulic brake boosting, shorter brake pedal travel is sufficient than if the pressure supply were to fail. This makes braking more convenient and shortens the response times of the brakes, which especially when sudden full braking is required shortens the stopping distance. There is also the advantage that a failure of the pressure supply apparatus is indicated via longer brake pedal travel. The ratios of the shorter brake pedal travel distances to the longer ones are known by the term "translation jump". In comparison with conventional brake boosters, lesser pedal forces are required to attain the same brake pressure.

The brake booster according to this invention has the advantage that an early blockage of brake circuits with respect to the associated refill containers takes place; as a result, the maximum possible displacement path of the second booster piston is virtually fully available to generate booster power. The brake booster also has the advantage that the first master cylinder piston can be short in structure, despite the second booster piston, which is displaceable on it, and despite the pump piston. Further characteristics revealed herein have the advantage that the brake booster, despite the additional booster cylinder, can be approximately just as short as previously known brake boosters, yet if there is a failure, greater and even considerably greater foot pedal forces are not required. In other words, in the prior art the forces needed to operate the brakes are much greater and quite frequently a lot greater than that force which is required by the apparatus disclosed herein.

Further embodiments disclosed have the advantage that they considerably shorten the structural length of the brake booster. Also another further advantage is that the brake booster acts as a so-called follow-up booster.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
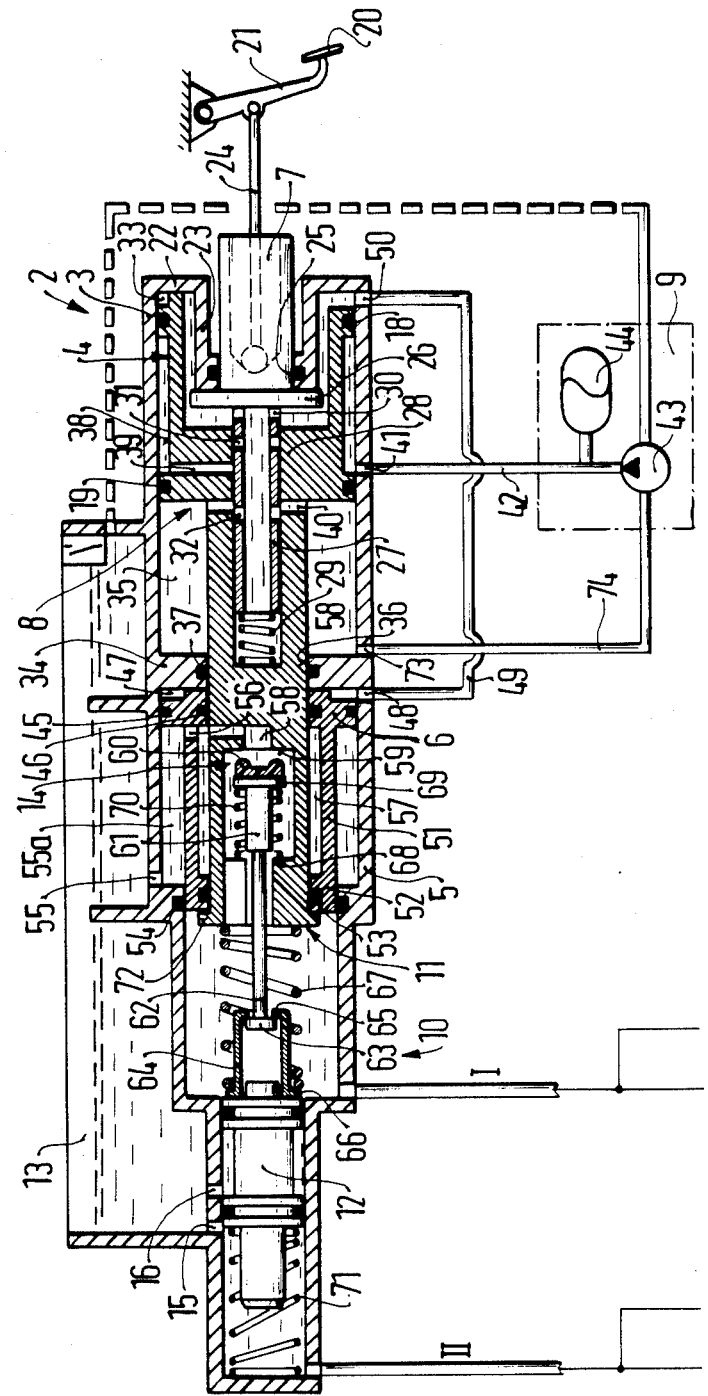
FIG. 1 shows a first exemplary embodiment of the brake booster according to the invention in a longitudinal section.

The first exemplary embodiment of the brake booster 2 according to the invention as shown in FIG. 1 has a first booster cylinder 3, a first booster piston 4, a second booster cylinder 5, a second booster piston 6, a tappet 7 and a brake valve 8. The brake booster 2 is supplied by a pressure supply apparatus 9 and is combined with a master brake cylinder 10. The master brake cylinder 10 has a first master cylinder piston 11, a second master cylinder piston 12, a refill container 13, a filling valve 14, refill openings 15, 16 and two brake circuits I and II.

The first booster cylinder 3 receives the first booster piston 4, which is substantially cup-shaped, in a longitudinally displaceable manner. The first booster piston 4 has sealing rings 18, 19 near its ends, which press in a sealing manner against the first booster cylinder 3. An end wall 22 is disposed on one end of the first booster cylinder 3, which is oriented toward a brake pedal lever 21 bearing a brake pedal 20. From this end wall 22, a tube 23 extends toward the master cylinder 10. This tube 23 at least partially encompasses the tappet 7 and forms a bearing for it. The tappet 7 is displaceable toward the master cylinder 10 by means of the brake pedal 20 via the brake pedal lever 21 and a pedal rod 24. A sealing ring 25 is inserted into the tube 23 and sealingly surrounds the tappet 7. The tappet 7 is combined with a stop collar 26, which is located inside the first booster cylinder 3.

The brake valve 8 has a tubular control slide 27, which is aligned coaxially with the tappet 7 and joined with it and extends into the first booster cylinder 3, and also has a control sleeve 28, which is combined into a structural unit with the first booster piston 4. A soft restoring spring 29 is disposed such that it urges the control slide 27 and the tappet 7 in the direction of the brake pedal lever 21. Directly beside the stop collar 26, the tubular control slide 27 has radially extending compensation bores 30. Spaced apart from these compensation bores 30, offset toward the master cylinder 10, are, first, radially extending inflow bores 31 and finally radially extending relief bores 32. Between the first booster piston 4 and the end wall 22, a first booster chamber 33 is defined by the first booster cylinder 3. Toward the master cylinder, the first booster cylinder 3 is defined by an end wall 34. Between this end wall 34 and the first booster piston 4 there is an auxiliary chamber 35. The end wall 34 has a bore 36 coaxial with the first booster cylinder 3, and the first master cylinder piston 11, which is rod-like in embodiment, passes all the way through this bore 36 as far as the first booster piston 4.

A sealing ring 37 borne by the end wall 34 sealingly surrounds the first master cylinder piston 11. The master cylinder piston 11 is rigidly joined to the first booster piston 4. Between the sealing rings 18 and 19, the first booster piston 4 has a circumferential groove 38. A connecting bore 39 begins adjacent to this circumferential groove 38 and extends as far as the circumference of the tubular control slide 27. Adjacent to the first booster piston 4, outflow bores 40 extend crosswise through the first master cylinder bore 11. Beside the sealing ring 19 and coinciding with the circumferential groove 38 of the first booster piston 4, the first booster cylinder 3 has a supply connection 41. This supply connection 41 communicates via a line 42 with the pressure supply apparatus 9. The pressure supply apparatus is embodied in a manner known per se, so it is sufficient herein to name a pump 43 and a pressure reservoir 44 as its essential components.

In coaxial alignment with the first booster cylinder 3, the second booster cylinder 5 adjoins the end wall 34 in axial alignment with the first booster cylinder 3. The second booster cylinder 5 receives the second booster piston 6. The second booster piston 6 is embodied as an annular body and is slidably supported on the first master cylinder piston 11 and bears two sealing rings 45 and 46. The sealing ring 45 rests on the second booster cylinder 5. The sealing ring 46 sealingly encompasses the rod-like first master cylinder piston 11. Between the second booster piston 6 and the end wall 34, the second booster cylinder 5 surrounds a second booster chamber 47, which is provided with a connection 48 adjoining the end wall 34. From this connection 48, a line 49 leads to a connection 50, which discharges into the first booster chamber 33 adjacent to the end wall 22.

A pump piston 52 is also embodied as an annular piston and is slidably supported on the master cylinder piston 11. A tubular intermediate piece 51 is molded onto the pump piston 52, having the same outer diameter as the pump piston 52 and joining it with the second booster piston 6. The pump piston 52 receives a sealing ring 53, which like the sealing ring 46 sealingly encompasses the first master cylinder piston 11. The master cylinder 10 has an additional sealing ring 54, which surrounds the pump piston 52 protruding into it or, when the pump piston 52 is displaced, surrounds the tubular intermediate piece 51 which has the same diameter. Near the sealing ring 54, the second booster cylinder 5 has a connecting bore 55, which opens toward the refill container 13 and an annular chamber 55a enclosed between the booster cylinder 5, the second booster piston 6 and the intermediate piece 51. Adjacent to the second booster piston 6, the tubular intermediate piece 51 is provided with a transverse bore 56, so that a second annular chamber 57, located between the intermediate piece 51 and the first master cylinder piston 11 and closed off with respect to the master cylinder 10, communicates with the refill container 13 via the bore 55 in the booster cylinder 5 which extends from the first annular chamber 55a. The filling valve 14 disposed in the first master cylinder piston 11 communicates via a conduit 58 in the first master cylinder piston 11 with this second annular chamber 57. The conduit 58 terminates at a valve seat 59 of the filling valve 14. A closing element 60 is associated with the valve seat 59. This closing element is secured via a supporting disk 69 on a rod 61, which is extended in the form of a stem 62 in the direction of the second master cylinder piston 12; on its end, the stem 62 has a head 63. The head 63 is located inside a sheath 64, which has a collar 65 pointing inward and surrounding the stem 62 with play. The sheath 64 also has a radially outwardly offstanding flange 66, with which it rests on the second master cylinder piston 12. A spreader spring 67 is installed between this flange 66 and the first master cylinder piston 11. Inside the first master cylinder piston 11, there is at least one stop protrusion 68. This stop protrusion 68, the rod 61, the stem 62, the head 63 and the sheath 64 limit the expandibility of the spreader spring 67. A closing spring 70 is installed with initial stress between the stop protrusion 68 and the supporting disk 69 and urges the second master cylinder piston 12 toward the first master cylinder piston 11. Under the influence of the restoring spring 71, the second master cylinder piston 12 moves, when the brake pedal 20 is not actuated, into a position in which the refill opening 15 connects the refill container 13 and the brake circuit II. The first master cylinder piston 11 has a collar 72 acting as a coupling means, which stands radially away from the first master cylinder piston 11 between the pump piston 52 and the spreader spring 67. Because of this collar 72, the restoring spring 71 and the spreader spring 67, via the first master cylinder piston 11, are capable of displacing the pump piston 52 and the associated second booster piston 6 into a starting position. The starting position is defined by the end wall 34, which forms an axial stop.

Mode of Operation of the First Exemplary Embodiment

If the pressure supply apparatus 9 is switched off or has failed and if its pressure reservoir 44 is empty, then braking can be effected without brake boosting. To this end, the tappet 7 is moved in the direction of the master cylinder 10 via the brake pedal lever 21 and the pedal rod 24. As a result, the tappet 7 finally, upon being sufficiently displaced, presses with its stop collar 26 against the first booster piston 4. Because of its rigid connection with the first booster piston 4, the first master cylinder piston 11 is displaced toward the second master cylinder piston 12. The spreader spring 67 accordingly displaces the second master cylinder 12 as well, causing it to overtake the refill opening 15 and thereby close off the brake circuit II relative to the refill container 13. A pressure buildup begins in the brake circuit II, which offers increasing resistance to the spreader spring 67, which is therefore elastically compressed. As a result, the closing spring 70 becomes effective and presses the closing element 60 against the valve seat 59. As a result, the brake circuit I is also blocked off with respect to the refill container 13. A further displacement of the brake pedal 20 effects a further displacement of the first master cylinder piston 11, causing the piston 11 to generate increasing braking pressures in the brake circuits I and II. The brake circuits I and II terminate in wheel brake cylinders, not shown. These wheel brake cylinders convert the braking pressures into braking forces. To attain braking forces of a desired magnitude, a stroke of the brake pedal 20 is required, which is dependent on the volumetric capacity of the wheel brake cylinders, the elasticity of the captive pressure medium, and the cross-sectional area of the first master cylinder piston 11. The cross-sectional area of the first master cylinder piston 11 and the dimensions of the brake pedal lever 21 are selected such that by actuating the brake pedal it is possible to generate sufficiently great braking pressures for emergency braking in brake circuits I and II. When these brake pressures are generated, the brake pressure prevailing in brake circuit I is exerted on the pump piston 52, causing it to pressure the second booster piston 6 against the end wall 34. In braking without brake boosting, the work of positive displacement that is performed in the master brake cylinder 10 and is required for the pressure buildup is therefore generated solely by means of the brake pedal 20, via the master cylinder brake piston 11. Because undesirably long displacement paths of the master cylinder piston 11 are necessary for performing the work of positive displacement due to the given cross section, especially when used in disk brakes in heavy vehicles, the brake pedal 20 must travel relatively long distances. From the following portion of the functional description it will become apparent how such disadvantageously long brake pedal paths can be avoided when brake boosting is in effect.

If the pressure supply apparatus 9 is shut on and sufficient pressure is available, then the pumping work required for braking is performed predominantly by the brake booster 2. In the basic position of the brake pedal 20, the restoring spring 29 causes the stop collar 26 to be axially spaced apart from the first booster piston 4, the control slide 27 to close the connecting bore 39, and the relief bores 32 and the outflow bores 40 to intersect with one another. As a result, the first booster chamber 33 communicates with the auxiliary chamber 35 via the compensation bores 30, the control slide 27, the relief bores 32 and the outflow bores 40. The auxiliary chamber 35, in turn, is pressure relieved via a connection 73, located near the end wall 34, and via a return line 74 beginning at the connection 73 and leading to the pressure supply apparatus 9. An actuation of the brake pedal 20 initially, via the tappet 7, causes a displacement of the control slide 27 such that the relief bores 32 are moved away from the outflow bores 40 and the control slide 27 closes the outflow bores 40. Subsequently as inflow bores 31 come into alignment with the connecting bore 39, so that pressure medium flows from the pressure supply apparatus 9 into the control slide 27 and through the compensation bores 30 into the first booster chamber 33. A partial quantity of the inflowing pressure medium flows through the line 49 into the second booster chamber 47. As a result, the first booster piston 4 and the second booster piston 6 are acted upon by boosting pressure. The surface area that is acted upon of the first booster piston 4 and the cross-sectional area of the first master cylinder piston 11 effect a first pressure translation ratio. The hydraulically effective areas of the second booster piston 6 and its pump piston 52 are matched to one another such that beginning with the boosting pressure, a larger pressure translation takes place than at the first master cylinder piston 11. This pressure translation ratio is for instance up to 10% or 20% greater than the first pressure translation ratio. In an intended manner, the result of this is that the pump piston 52 is capable of overcoming a higher counterpressure than the first master cylinder piston 11 can. As a result, the pump piston 52 attempts to overtake the first master cylinder piston 11, thereby striking the collar 72. Thus, in the event that boosting pressure is directed into the two booster cylinders 3 and 5, the collar 72 couples the pump piston 52 to the first master cylinder piston 11. If the boosting pressure rises further, these two pistons therefore move synchronously, and both of them in common positively displace pressure medium from the master cylinder 10 into the brake circuits I and II. Accordingly, it is clear that with the same stroke of the first master cylinder piston 11, more pressure medium is positively displaced into the brake circuits than in the first functional example described above; in which only the master cylinder piston 11 is moved. To generate a predetermined braking pressure in the brake circuits during brake booster operation, the first master cylinder piston 11 requires a shorter displacement path than during operation without brake boosting. Accordingly, the distance the brake pedal travels is also notably shorter. As already mentioned, the ratio between the short brake pedal travel during brake boosting and the longer brake pedal travel if brake boosting is absent is known as "translation jump".

Figure 2:
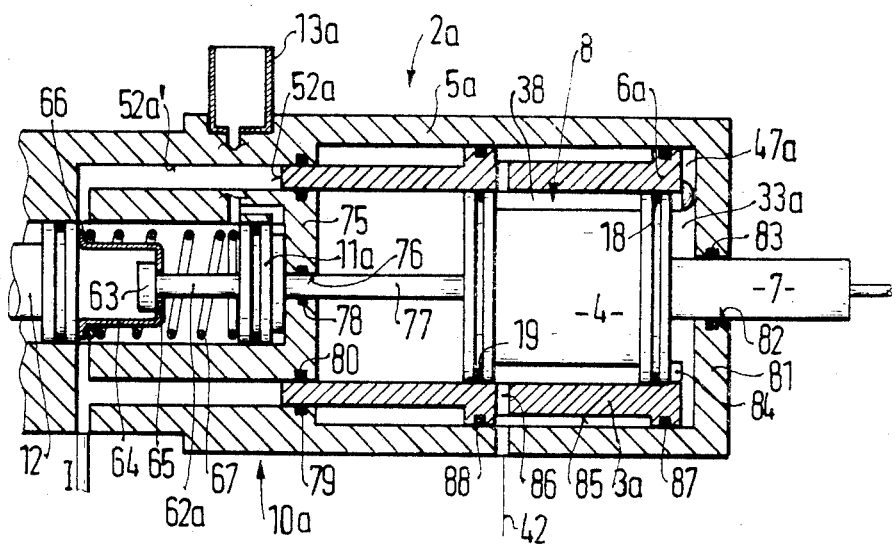
FIG. 2 shows a second exemplary embodiment of the brake booster in longitudinal section.

The second exemplary embodiment of the brake booster 2a shown in FIG. 2 has a first booster cylinder 3a, a first booster piston 4, a second booster cylinder 5a, a second booster piston 6a, a tappet 7, a brake valve 8, and a pressure supply apparatus 9 and is combined with a master cylinder 10a.

The tappet 7 serves to actuate the brake valve 8, which is embodied identically to the brake valve 8 of the first exemplary embodiment; in the manner already described, a brake pedal 20, a brake pedal lever 21 and a pedal rod 24 are associated with the tappet 7. The first booster piston 4 likewise has a circumferential groove 38 and next to it sealing rings 18 and 19. The first booster cylinder 3a is embodied in the form of a cylinder liner, which is slidably supported in the second booster cylinder 5a and the end nearer the brake pedal of which has a wall thickness such that this end forms the second booster piston 6a. On the opposite end, which points toward the master brake cylinder 10a, the wall thickness is selected to be smaller, so that there the cylinder liner forms a pump piston 52a. In alignment with the pump piston 52a, an annular pump cylinder 52a' is adjacent to the second booster cylinder 5a. A portion of the master cylinder 10a that is associated with the brake circuit I is disposed coaxially inside the pump cylinder 52a' and receives a first master cylinder piston 11a in a longitudinally displaceable manner. This first master cylinder piston 11a is adjoined by the spreader spring 67 already described above, which presses against the flange 66 of the sheath 64, also already mentioned above. The expansibility of the spreader spring 67 is again limited by means of a collar 65 formed on the sheath 64, and by a head 63 and a stem 62a. The brake circuit I is connected between the second master cylinder piston 12 and the first master cylinder piston 11a. The annular pump cylinder 52a', into which the pump piston 52a plunges, likewise communicates with the brake circuit I.

Between the first master cylinder piston 11a and the first booster piston 4, the master cylinder 10a is defined by a partition 75. The partition 75 has a bore 76, through which a pressure rod 77, which is inserted between the first booster piston 4 and the first master cylinder piston 11a, can be displaced. A sealing ring 78 borne by the partition 75 rests on the pressure rod 77. Sealing rings 79 and 80 are also assigned to the pump piston 52a, preventing pressure medium from escaping between the pump piston 52a and its associated annular pump cylinder 52a'. Toward the brake pedal, the second booster cylinder 5a has an end wall 81 with an opening 82, through which the tappet 7 can be displaced toward the first booster piston 4. To prevent a loss of pressure medium, a sealing ring 83 is again disposed elastically surrounding the tappet 7. The hydraulically effective surface areas of the second booster piston 61 and its pump piston 52a are again matched to one another in such a way that their boosting ratio is again larger than the boosting ratio of the first booster piston 4 and its first master cylinder piston 11a. The difference in the translation ratios can again be on the order of magnitude of up to 20%; preferably, a magnitude of 10% is selected. If the first booster piston 4 and the second booster piston 6a are acted upon by the same boosting pressure, then the second booster piston 6a again attempts to overtake the first booster piston 4. Protrusions 84 secured to the second booster piston 6a are provided as coupling means by which the overtaking is prevented; these protrusions 84 extend into the cross section of the first booster cylinder 3a, and upon the displacement of the second booster piston 6a toward the master brake cylinder 10a, these protrusions rest on the first booster piston 4 and displace it. Between the end wall 81 and the two booster pistons 4 and 6a, there is a chamber, which in the vicinity of the first booster piston 4 is called the first booster chamber 33a and in the vicinity of the booster piston 6a is called the second booster chamber 47a. The two booster pistons 4, 6a are thus acted upon with one and the same boosting pressure, without the aid of any lines or the like, as soon as boosting pressure is directed into the second booster cylinder 5a by means of the brake valve 8. To generate this boosting pressure, pressure is delivered from the pressure supply apparatus 9 to a circumferential groove 85, which is disposed on the second booster piston 6a. From there, the pressure from the pressure supply travels through at least one bore 86 and into the circumferential groove 38 of the first booster piston 4. In order to prevent an unintended escape of pressure medium from the circumferential groove 85, sealing rings 87 and 88 are disposed on the second booster piston 61 on both sides of this groove 85. Since as already mentioned the brake valve 8 is identical in embodiment to the brake valve of the first exemplary embodiment, therefore fluid is permitted into the area 33a such as set forth in FIG. 1 for the fluid that flows via valve 8 to the chamber confined by the cup-shaped end of piston 4, it is therefore believed that a description of its function is unnecessary. By comparison with the first exemplary embodiment, this second embodiment has the advantage that the second booster piston 6a forms the booster cylinder 3a of the first booster piston 4. As a result, the second exemplary embodiment is shorter in structure than the first. A further advantage is that for the master brake cylinder 10a, the first master cylinder piston 11a can be taken without modification from a mass-produced series of previously conventional master cylinder pistons. This makes the design of the unit comprising the brake booster 2a and master brake cylinder 10a less expensive.

Figure 3:
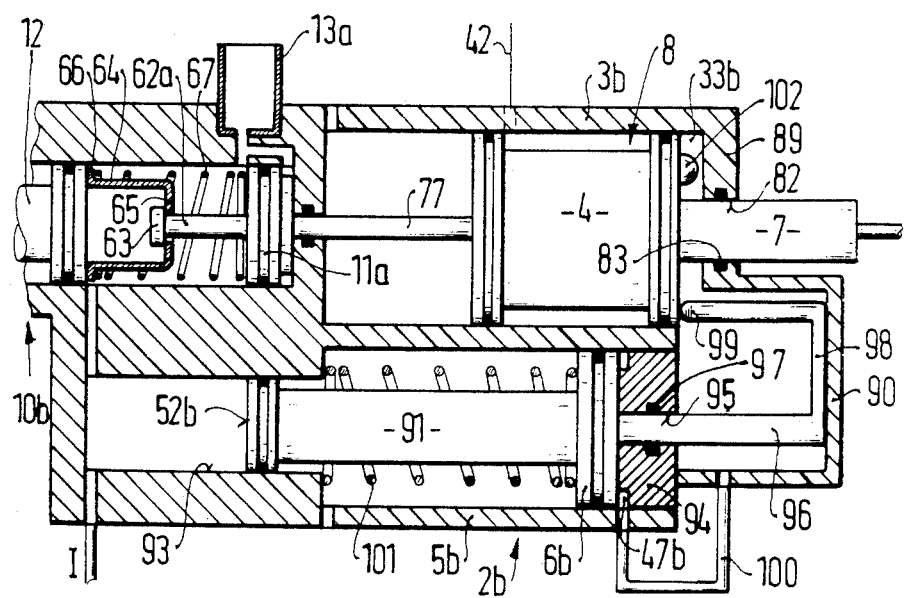
FIG. 3 shows a third exemplary embodiment, again in longitudinal section.

The third exemplary embodiment of a brake booster 2b as shown in FIG. 3 takes over the first booster piston 4, the tappet 7, the brake valve 8, the brake pedal 20, the brake pedal lever 21, the pedal rod 24 and the pressure rod 77 from the second exemplary embodiment of FIG. 2, described above. The first booster piston 4 is displaceable in a first booster cylinder 3b. Toward the brake pedal, this first booster cylinder 3b has an end wall 89, in which a bore 82 for guiding the tappet 7 is located. The tappet 7 is surrounded by a sealing ring 83. Below the tappet 7, the end wall 89 is shaped into a dome 90 toward the brake pedal 20. A second booster cylinder 5b extends parallel to and below the first booster cylinder 3b and receives a second booster piston 6b. Toward the master brake cylinder 10b, the second booster piston 6b is adjoined by a piston rod 91. The piston rod 91 is joined to a pump piston 52b. The pump piston 52b is surrounded by a pump cylinder 93. The hydraulically effective surface areas of the second booster piston 6b and the pump piston 52b are again matched to one another such that their boosting ratio is at least as great as at the first booster piston 4 and a master cylinder piston 11a associated with it, which is taken over from the second exemplary embodiment. Toward the brake pedal, the second booster cylinder 5b has an end wall 94 with a bore 95. A coupling rod 96 is passed through this bore 95. A sealing ring 95 sealingly surrounds the coupling rod 96. The coupling rod 96 is firmly joined to the second booster piston 6b. Inside the dome 90, an arm 98 is rigidly joined to the coupling rod 96. The arm 98 is provided with a reentrant portion, as shown, this portion being bent at an angle and with its angled end 99, which is aligned parallel with the tappet 7, it points toward the first booster piston 4. A first booster chamber 33b inside the first booster cylinder 3b is associated with the first booster piston 4. A second booster chamber 47b communicates with the first booster chamber 33b, for instance via a line 100. A bore, not shown, which extends through the end wall 94, however, can be used instead of the line 100 to join the two booster chambers 33b and 47b to one another. A restoring spring 101 determines the basic position of the second booster piston 6b, in which this piston 6b rests on the end wall 94. The first booster piston 4 has a protrusion 102, which assures a minimum spacing between the booster piston 4 and the end wall 89. A spreader spring 67 disposed in the master brake cylinder 10b and a restoring spring, not shown, which presses upon the master cylinder 12 also taken over from the foregoing embodiment but not shown, have the effect that when the brake pedal 20 is not actuated, the protrusion 102 rests on the end wall 89. The pump cylinder 93 communicates with the brake circuit I.

Mode of Operation of the Third Exemplary Embodiment

If the pressure supply apparatus 9 is not switched on or has failed, then the first booster piston 4, the pressure rod 77 and the first master cylinder piston 11a can be displaced by foot pressure exerted on the brake pedal 20. As a result, braking pressure can be generated in the brake circuit I and in a second brake circuit II, not shown. As in the first exemplary embodiment, relatively long pedal travel on the part of the brake pedal 20 is required to generate high braking pressures.

If the pressure supply apparatus 9 is providing sufficient pressure to the brake valve 8, then by actuating the brake pedal 20, which effects a displacement of the control slide 27 (not shown), boosting pressure can be directed into the first booster chamber 33b. The boosting pressure extends via a detour through the dome 90 and the line 100 into the second boosting chamber 47b. There, the second booster piston 6b is acted upon, and in order to raise the braking pressure it attempts to displace the pump piston 52b toward the master cylinder 10b. Because of the selection of boosting ratios already mentioned, the booster piston 6b, by being coupled via the coupling rod 96, the arm 98 and its end 99, displaces the first booster piston 4 toward the master brake cylinder 10b. Naturally in this process the force exerted by the end 99 upon the first booster piston 4 will be that force which in the event of brake boosting effects a synchronous displacement of both booster pistons 4 and 6b. If the brake pedal 20 is released, the effect is a pressure relief of the booster chambers 33b and 47b, so that both booster pistons 4 and 6b return to their starting positions, causing the braking pressures in the brake circuits I and II to drop.

The foregoing relates to preferred exemplary embodiments of the invention, it being understood that other variants and embodiments thereof are possible within the spirit and scope of the invention, the latter being defined by the appended claims.

What is claimed is:

1. A brake booster having a first booster cylinder (3) and a first booster piston (4) disposed therein, a first master cylinder, a first master cylinder pistion therein, said first booster piston adapted to displace said first master cylinder, a first master cylinder piston therein, supply at least one brake circuit, a tappet means for mechanical displacement of said first booster piston, a brake valve coupled to said first booster piston and said tappet, said brake valve adapted to direct boosting pressure into said first booster cylinder, a second booster cylinder (5) in axial alignment with said first booster cylinder, and spaced therefrom by a partition (34) with said first and second booster cylinders communicating hydraulically with each other, a second booster piston (6) associated with said first master cylinder, said second booster piston arranged to be actuated by boosting pressure with said first master cylinder piston forming an extension of said first booster piston and extending through said partition and said second booster piston, and a pump piston (52) displaceable by said second booster piston (6) into a brake circuit pressure chamber for generating braking pressure in said at least one brake circuit, said second booster piston (6) and said pump piston (52) have hydraulically effective surface areas which are matched to one another such that they have a larger boosting ratio than said first booster piston (4), said first master cylinder piston (11) includes coupling means disposed relative to said first and said second booster pistons such that a displacement into said brake circuit pressure chamber, dictated by boosting action, of said second booster piston effects a displacement of said first master cylinder piston and said first booster piston to generate braking pressure.

2. A brake booster as defined by claim 1, in which said second booster piston has a boosting ratio of approximately 10 to 20% greater than a boosting ratio of said first booster piston.

3. A brake booster as defined by claim 2, in which said first master cylinder piston is affixed to said first booster piston and includes a centrally disposed filling valve which communicates with a refill container of said master cylinder said filling valve being controllable by a second master cylinder piston which is aligned in a tandem arrangement with said first cylinder piston.

4. A brake booster as defined by claim 1, in which said coupling means include means which engage said first booster piston to achieve booster action.

5. A brake booster as defined by claim 1, in which said first master cylinder piston is affixed to said first booster piston and includes a centrally disposed filling valve which communicates with a refill container of said master cylinder said filling valve being controllable by a second master cylinder piston which is aligned in a tandem arrangement with said first cylinder piston.

6. A brake booster as defined by claim 5, in which said second booster piston and said pump piston are embodied as annular pistons which concentrically surround the said master cylinder piston, and further that disposed between said annular pistons is an intermediate sleeve having at least one transverse bore, said transverse bore arranged to supply liquid to a filling valve which communicates with a refill container.

7. A brake booster as defined by claim 6, in which said first booster cylinder further includes an extension, said second booster cylinder is disposed therein and a supply line communicates with said second booster cylinder.

8. A brake booster as defined by claim 1, in which said brake value is positioned in and disposed concentric relative to said first booster piston.

9. A brake booster as defined by claim 8, in which said first booster piston is cup-shaped and includes a cylindrical portion directed toward said pedal with said cylindrical portion surrounding a tubular shaped end wall adapted to receive therein a portion of said tappet which extends through said end wall surrounded by said cylindrical portion of said first booster piston, said tappet includes a stop collar (26) within said first booster piston in which said tappet is embodied as a hydraulic sensing piston which acts counter to said pedal.

* * * * *